US012657409B2

(12) United States Patent　　(10) Patent No.: US 12,657,409 B2

Hernandez et al.　　(45) Date of Patent: Jun. 16, 2026

(54) MAGNETIC CARD READER COMPRISING A STATIONARY MAGNETIC READING HEAD

(71) Applicant: BANKS AND ACQUIRERS INTERNATIONAL HOLDING, Suresnes (FR)

(72) Inventors: Vincent Hernandez, Claveyson (FR); Jérôme Andre, Montoison (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 0 days.

(21) Appl. No.: 18/876,724

(22) PCT Filed: Jun. 20, 2023

(86) PCT No.: PCT/EP2023/066660

§ 371 (c)(1),
(2) Date: Dec. 19, 2024

(87) PCT Pub. No.: WO2023/247553

PCT Pub. Date: Dec. 28, 2023

(65) Prior Publication Data

US 2025/0371293 A1　　Dec. 4, 2025

(30) Foreign Application Priority Data

Jun. 20, 2022　(FR) ....................................... 2206050

(51) Int. Cl.
G06K 7/08　　(2006.01)

(52) U.S. Cl.
CPC .................................... G06K 7/082 (2013.01)

(58) Field of Classification Search
CPC ...................................................... G06K 7/082
See application file for complete search history.

(56) References Cited

U.S. PATENT DOCUMENTS 5,698,832 A * 12/1997 Someya ................. G06K 7/084
235/475
5,923,019 A 7/1999 Bedell et al.
(Continued)

FOREIGN PATENT DOCUMENTS

FR 2762698 A1 10/1998
GB 1390794 A 4/1975
(Continued)

OTHER PUBLICATIONS

CN 208922262U—A new double-digit magnetic head, magnetic head assembly, card reader and card reading device, 13 pages. (Year: 2025).*

*Primary Examiner* — Tuyen K Vo

(74) *Attorney, Agent, or Firm* — Dilworth IP, LLC

(57) ABSTRACT

A magnetic card reader including an electronic card, a magnetic reading head which is intended to read data contained in a magnetic strip of a magnetic card and to transmit these data to the electronic card, and a zone for passage of a magnetic card, in which a magnetic card is intended to slide and which includes a guide member intended to guide the magnetic card as it slides in the passage zone. The magnetic reading head is fixedly mounted on the magnetic card reader. The guide member is integral with resilient deformation members which are intended to come into contact with the magnetic card so as to deform it when the magnetic card slides in the passage zone in order to allow the magnetic strip to be read by the magnetic reading head.

12 Claims, 2 Drawing Sheets

(56) References Cited

U.S. PATENT DOCUMENTS

| | | | | |
|---|---|---|---|---|
| 6,231,395 B1 * | 5/2001 | Odic | .................... | G06K 7/0021 |
| | | | | 439/60 |
| 6,342,982 B1 * | 1/2002 | Kanayama | ......... | G11B 17/0408 |
| | | | | 360/2 |
| 9,613,234 B2 * | 4/2017 | Lo | .......................... | G06K 7/084 |
| 2008/0073433 A1 * | 3/2008 | Nam | ....................... | E05C 19/06 |
| | | | | 235/439 |
| 2020/0348376 A1 | 11/2020 | Soubirane et al. | | |

FOREIGN PATENT DOCUMENTS

| | | | | | |
|---|---|---|---|---|---|
| GB | 2356724 A | * | 5/2001 | ............. | G06K 7/084 |
| WO | 2019/138085 A1 | | 7/2019 | | |

* cited by examiner

[Fig. 3]
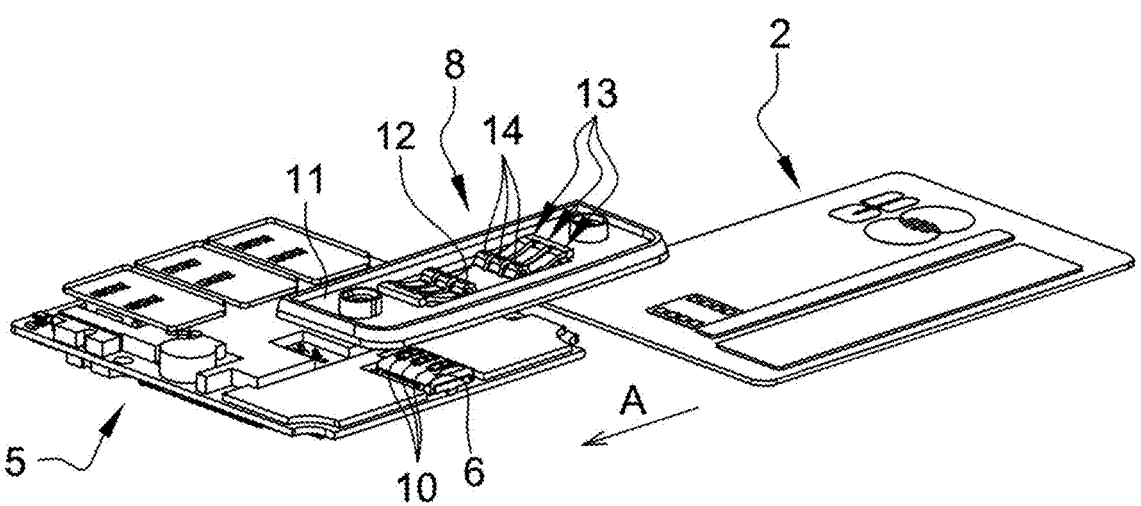
[Fig. 4]
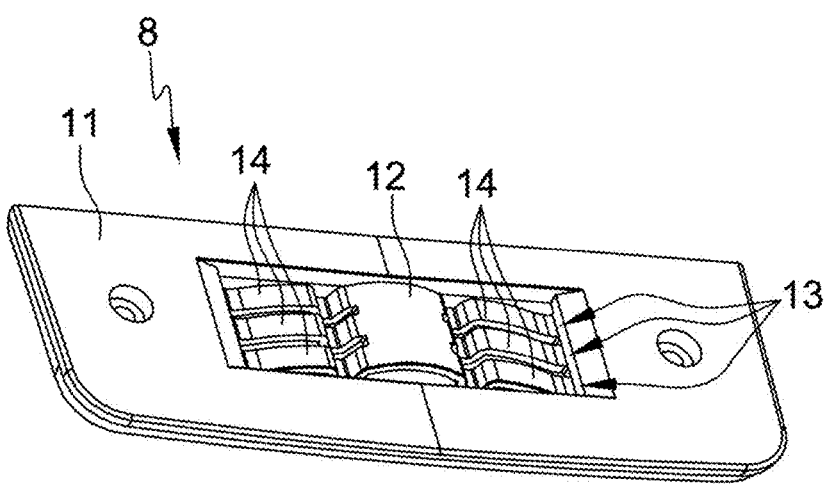
[Fig. 5]
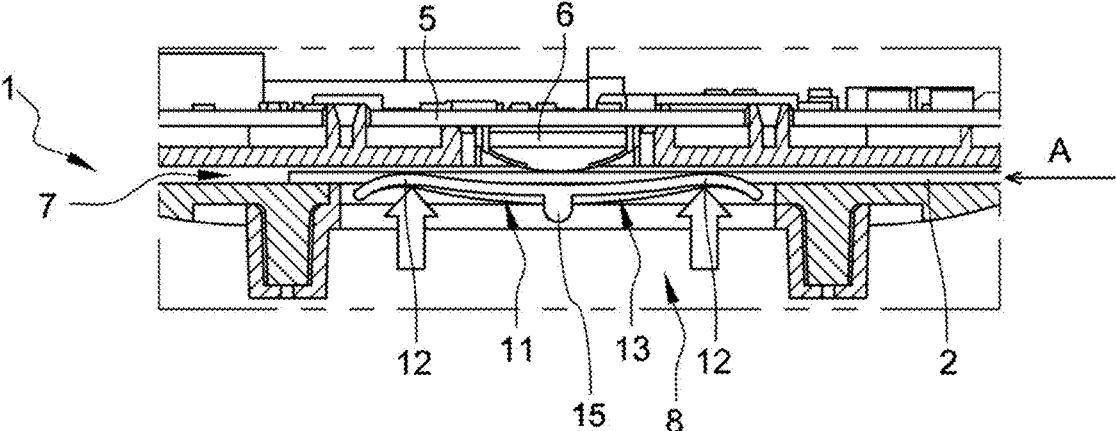

MAGNETIC CARD READER COMPRISING A STATIONARY MAGNETIC READING HEAD

FIELD OF THE INVENTION

The invention relates to the field of magnetic card readers and electronic payment terminals comprising such magnetic card readers.

BACKGROUND

To obtain a satisfactory reading of a magnetic strip of a magnetic card by a magnetic card reader, when passing the magnetic card in the reader the magnetic reading head must be in contact with the magnetic strip of the magnetic card and the quality of this contact must be good. Since magnetic cards are rigid, deformable means for moving the magnetic reading head in order to press the magnetic reading head against the magnetic card as it slides in a guide member of the magnetic card reader have therefore been developed. The force applied on the magnetic reading head by these deformable means for moving the magnetic reading head must be calculated so as to avoid significantly increasing the force required to pass the magnetic card in the card reader so that a user of the device does not feel that the magnetic card is blocked as it passes in the reader.

Such magnetic card readers have disadvantages. Firstly, they are fragile. Since the magnetic reading head moves, the electronic connection between this magnetic reading head and an electronic card of the magnetic card reader is in fact made by using a flexible printed circuit which, by nature, is fragile. In addition, such flexible printed circuits are expensive and complex to integrate when assembling the reader. Apart from flexible printed circuits, the deformable means for moving the head further comprise parts that are expensive, fragile and complex to implement during assembly. In particular, they must be adapted to each type of magnetic reading head. In addition, protection against the electromagnetic environment must be provided, such protection being complicated to implement since the magnetic reading head changes position regularly.

SUMMARY

The invention aims in particular to provide a magnetic card reader capable of reliably reading the data present on a magnetic card, and which is robust, simple and inexpensive to manufacture.

The invention therefore relates to a magnetic card reader comprising:
- an electronic card which is intended to receive and process data coming from a magnetic card,
- a magnetic reading head which is intended to read data contained in at least one magnetic strip of a magnetic card and to transmit these data to the electronic card,
- a zone for passage of a magnetic card, in which a magnetic card is intended to slide and which comprises guide means which are intended to guide the magnetic card as the magnetic card slides in the passage zone, wherein the magnetic reading head is fixedly mounted on the magnetic card reader, characterised in that the guide means are integral with resilient deformation means which are intended to come into contact with the magnetic card so as to deform it when the magnetic card slides in the passage zone in order to allow the magnetic strip of the magnetic card to be read by the magnetic reading head.

Thus, since the magnetic reading head is fixedly mounted on the reader, there is no need to use flexible printed circuits for the connection between the magnetic reading head and the electronic card, which reduces the manufacturing costs and simplifies the assembly of the magnetic card reader during its manufacture. In addition, the magnetic card reader thus obtained is also more robust due to the absence of a flexible printed circuit and deformable means for moving the head. The deformable means for moving the head are in fact fragile elements that are complex to implement on the reader.

The fact that the resilient means for deforming the magnetic card are part of the guide means is advantageous since it is a part of the magnetic card reader which can easily be modified to be adapted to different types of magnetic cards or magnetic reading heads used in order to obtain the required force to be applied on the magnetic card. More particularly, since the guide means are integral with the resilient deformation means, it is easier to manufacture and maintain the magnetic card reader. Correct positioning of the resilient deformation means with respect to the guide means is in fact obtained when manufacturing the element comprising these two means, it then being possible to mount this element directly on the box of the magnetic card reader. Consequently, there is no need for an adjustment step before using the magnetic card reader in order to position the resilient deformation means correctly. In addition, there is no risk of a subsequent change of position of the resilient deformation means and therefore there is no need for one or more subsequent handling steps intended to correct this change of position. Incorrect positioning of the resilient deformation means leads in particular to a risk of damaging the magnetic reading head or of a magnetic strip of the magnetic card. The guide means and the resilient deformation means could be manufactured by moulding.

A magnetic card is an electronic card provided with a magnetic strip on which data are stored by magnetic recording. The magnetic strip of this magnetic card can thus be read by a magnetic reading head in order to obtain the data stored in this magnetic card and possibly transmit them to an electronic card which can then process these data. Magnetic cards are for example used as bank card, car park access card, identification card or secure room access card.

The invention may also comprise one or more of the following optional characteristics, taken alone or in combination.

The magnetic reading head is welded to the electronic card. It is therefore easier to assemble the magnetic reading head since it is connected directly to the electronic card by welding, with no intermediates. The elimination of these intermediates not only simplifies assembly but also reduces manufacturing costs and makes the device more robust since, as the total number of parts in the device decreases, the overall risk of wear is reduced. In addition, welding the magnetic reading head directly to the electronic card improves the security of the magnetic card reader since, in this case, fraudulent interception of data transiting from the magnetic reading head to the electronic card is more complicated. This interception is made more complicated by the more direct connection between the magnetic reading head and the electronic card, but also since the electronic card thus forms a barrier covering part of the magnetic reading head and thus restricting accesses thereto. The security of the device could also easily be increased by adding in a layer of the electronic card a lattice intended to detect an attempt to drill a layer of the electronic card to secure the transmission of data between the magnetic reading head and the electronic card.

The resilient deformation means comprise at least one pressing member intended to make at least one press against at least one portion of the magnetic card in order to deform it such that the magnetic strip of the magnetic card is in contact with the magnetic reading head over its entire length when the magnetic card slides in the passage zone. Thus, it is the deformation of the magnetic card and not the movement of the magnetic reading head which ensures a permanent contact between the magnetic strip of the magnetic card and the magnetic reading head, when the magnetic card slides in the passage zone. Note that the deformation of the magnetic card is such that the magnetic strip is in contact with the magnetic reading head over its entire length, in other words the magnetic strip is pressed against the magnetic reading head by the pressing member from one of its longitudinal ends then slides such that the full length of the magnetic strip crosses the magnetic reading head up to its other longitudinal end. This ensures that the entire magnetic strip has been read correctly by the magnetic reading head.

The pressing member is intended to make a press against a portion of the magnetic card facing the magnetic reading head in order to press the magnetic strip of the magnetic card against the magnetic reading head. The passage zone is thus reduced at the position where the magnetic strip of the magnetic card is read by the magnetic reading head. This is a simple and efficient way of pressing the magnetic strip against the magnetic reading head.

The pressing member has a convex shape towards the magnetic reading head and its surface curvature is the same as that of the magnetic reading head. It is therefore easier to keep the card at the position where the magnetic reading head reads the magnetic strip. A symmetry between the two elements holding each side of the magnetic card is therefore created, which ensures greater stability than if the surface curvatures of the magnetic reading head and of the pressing member were different. In addition, it is easy to reproduce, on the pressing member, the shape of the surface curvature of the magnetic reading head such that the pressing member can easily be modified and adapted depending on the magnetic reading heads used.

The resilient deformation means are configured so that, in the rest position, the pressing member rests on the magnetic reading head without applying any force on it. Thus, the resilient deformation means do not apply any force at rest, which reduces their wear and increases their service lives accordingly. In addition, since they do not apply any force on the magnetic reading head at rest, they do not damage it. This configuration also guarantees that, regardless of the thickness of the magnetic card, the latter will not stress the resilient deformation means when it slides past the magnetic reading head, such that its magnetic reading strip is pressed against the magnetic reading head. According to alternative embodiments, the resilient deformation means could be configured so that, in the rest position, the pressing member extends opposite to, and at a predetermined distance from, the magnetic reading head. This predetermined distance is in particular defined as being less than a thickness of a magnetic card intended to slide in the passage zone comprising these resilient deformation means so that the magnetic card stresses the resilient deformation means as it slides in this passage zone.

The resilient deformation means comprise two pressing members intended to make a press against two portions of the magnetic card located each side of the magnetic reading head in order to press the magnetic strip of the magnetic card against the magnetic reading head. These two presses each side of the magnetic reading head create three deformation regions of the magnetic card, in other words the two portions of the magnetic card where the pressing members make a press and the portion of the magnetic card, comprising the magnetic strip, which is pressed against the magnetic reading head in order to be read by it. These three deformations therefore guarantee greater stability of the card as the magnetic card slides in the passage zone and also guarantee a good quality contact between the magnetic strip of the magnetic card and the magnetic reading head over the entire length of the magnetic strip as the magnetic card slides.

The resilient deformation means comprise at least three elastic return members intended to return the resilient deformation means to a rest position when or after the magnetic card slides in the passage zone. These three elastic return members enable the resilient deformation means to adapt to the way in which a user inserts the magnetic card in the passage zone and give the user a better feeling when passing the card. These three elastic return members create in fact a mechanical articulation for the resilient deformation means which can therefore compensate for a fault in the alignment of the magnetic card when it comes in front of the resilient deformation means so that a user does not feel that the card is blocked as it slides.

The resilient deformation means are configured so as to allow the magnetic card to pass in the passage zone as it slides in a first passage direction and as it slides in a second passage direction opposite to the first passage direction. Note that the resilient deformation means are substantially symmetrical axially. According to one embodiment, the resilient deformation means have an axial axis of symmetry. In this configuration, it is simple to manufacture resilient deformation means allowing the magnetic card to pass easily in the passage zone in either direction. This therefore simplifies the use of the magnetic card reader and reduces the risk of damaging the magnetic reading head or a magnetic strip of the magnetic card which would be caused by inserting the magnetic card in an inappropriate insertion direction. In addition, there is no need for a specific adjustment when a particular insertion direction is required.

The invention also relates to an electronic payment terminal comprising a magnetic card reader as described previously.

Advantageously, the zone for passage of a magnetic card consists of a slot formed in a lower edge of the electronic payment terminal. Thus, the size of the electronic payment terminal could be reduced compared with an electronic payment terminal in which the slot is formed in a side wall of the terminal. In addition, the movement required to slide the magnetic card in the slot is simpler and more ergonomic for the user.

BRIEF DESCRIPTION OF THE FIGURES

The invention will be better understood on reading the description which follows, given purely by way of non-limiting examples and with reference to the attached drawings in which:

FIG. 1 is a perspective view of an electronic payment terminal comprising a magnetic card reader according to a first embodiment of the invention;

FIG. 2 is a cross-sectional view of the electronic payment terminal of FIG. 1;

FIG. 3 is an exploded view showing a magnetic card and some of the components of the magnetic card reader of the electronic payment terminal of FIGS. 1 and 2;

FIG. 4 is a perspective view of the resilient deformation means;

FIG. 5 is a view similar to FIG. 2 of an electronic payment terminal comprising a magnetic card reader according to a second embodiment.

DETAILED DESCRIPTION

Figures 1, 2:
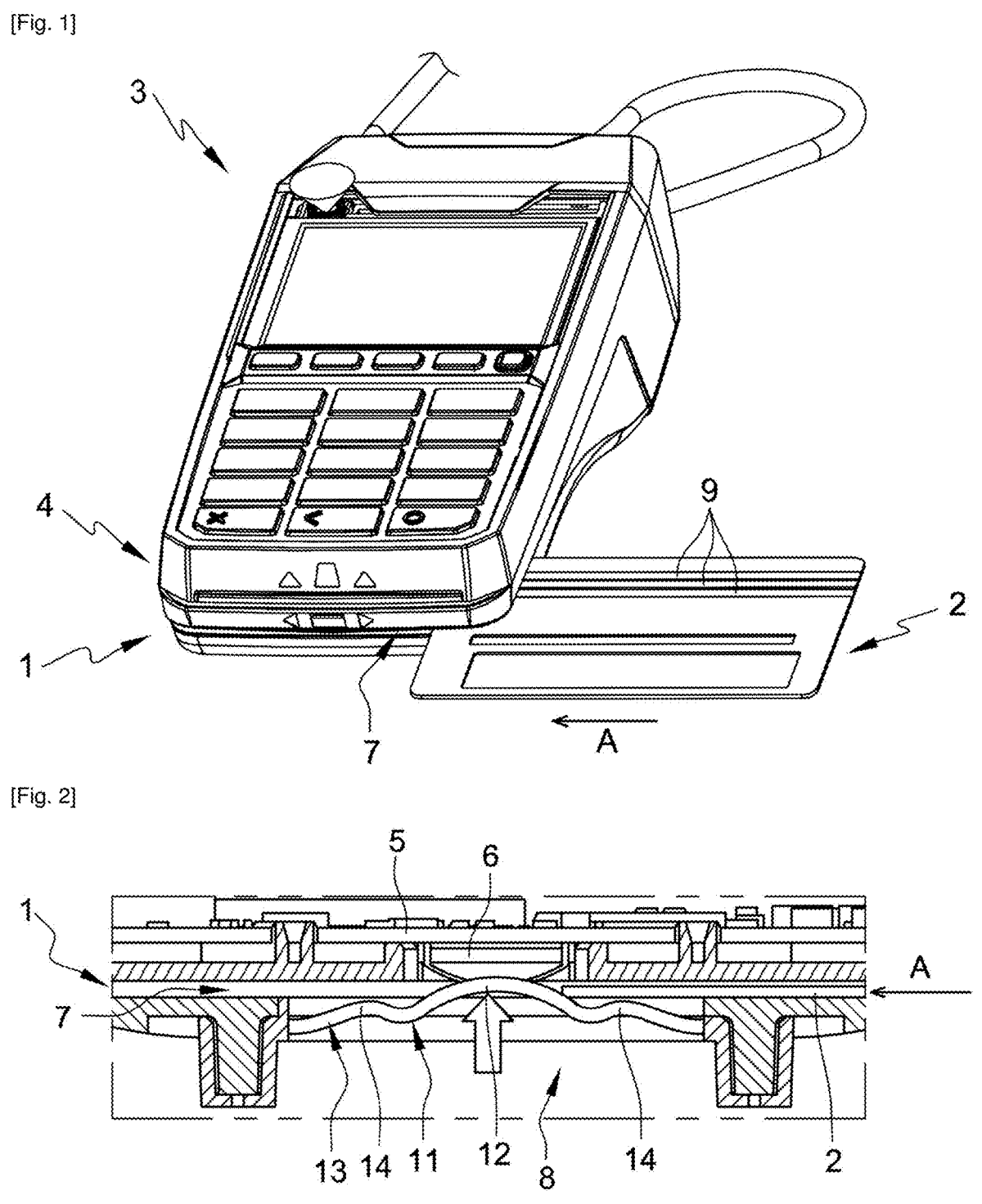

We will now describe, in reference to FIGS. 1 to 7, two embodiments of a magnetic card 2 reader 1 according to the invention, each one integrated in an electronic payment terminal 3 according to the invention.

The first embodiment is shown on FIGS. 1 to 4. The electronic payment terminal 3 therefore comprises the magnetic card reader 1 according to the invention and a traditional smart card reader 4 (see FIG. 1). The electronic payment terminal 3 comprises two side edges, one upper edge and one lower edge. The upper and lower edges are taken to be the usual orientations of use of an electronic payment terminal 3. Thus, the upper edge corresponds to the distal edge, in other words the longitudinal edge farthest away from the user when they use the electronic payment terminal 3 and the lower edge corresponds to the proximal edge, in other words the longitudinal edge closest to the user when they use the electronic payment terminal 3. In this case, in addition to the traditional location of the smart card reader 4 at the lower edge, the magnetic card 2 reader 1 is also located at the lower edge of the electronic payment terminal 3. Obviously, according to other embodiments, the terminal could be different from an electronic payment terminal 3, for example a car park access control terminal, an identification terminal or a secure room access control terminal.

The magnetic card 2 reader 1 comprises in particular an electronic card 5, a magnetic reading head 6, a zone 7 for passage of a magnetic card 2 and means 8 for guiding the magnetic card 2 (see FIG. 2).

In the present case, since the terminal is an electronic payment terminal 3, the magnetic card 2 is a payment card. It comprises three magnetic strips 9 intended for the magnetic storage of data. Obviously, the magnetic card 2 can comprise a different number of magnetic strips 9 depending on the embodiments.

The electronic card 5 is intended to receive and process data from the magnetic card 2, these data being read and transmitted by the magnetic reading head 6.

The magnetic reading head 6 is intended to read data contained in at least one of the magnetic strips 9 of the magnetic card 2 and to transmit these data to the electronic card 5 for processing therein. In this case, the electronic card 2 comprises three magnetic strips 9 and the magnetic reading head 6 therefore comprises a box having three gaps 10 each intended to read one of the magnetic strips 9 of the magnetic card 2. The magnetic reading head 6 is fixedly mounted on the electronic card 5. More particularly, the magnetic reading head 6 is welded directly to the electronic card 5 (see FIG. 3). This avoids the need for connection intermediates and therefore reduces the production costs while making the device less fragile, such connection intermediates generally comprising parts that are subject to mechanical wear and fragile, such as a flexible printed circuit. Obviously, according to alternative embodiments, the magnetic reading head 6 could be attached to the electronic card 2 by any other suitable attachment means.

The zone 7 for passage of the magnetic card 2 consists of a slot formed in the lower edge of the electronic payment terminal 3. This passage zone 7 is that in which the magnetic card 2 is intended to slide when a user wants to use the electronic payment terminal 3. This zone 7 for passage of the magnetic card 2 comprises the guide means 8 which are intended to guide the magnetic card 2 when it slides in the slot.

In the present case, the guide means 8 comprise resilient deformation means 11 which are intended to come into contact with the magnetic card 2 so as to deform it when the magnetic card 2 slides in the passage zone 7—in other words in the slot—in order to allow the magnetic strips 9 of the magnetic card 2 to be read by the magnetic reading head 6. More particularly, the guide means 8 are integral with the resilient deformation means 11. Thus, the guide means 8 and the resilient deformation means 11 form a single part which can be manufactured by any technique known by those skilled in the art, for example by moulding or by additive synthesis. Thus, the resilient deformation means 11 can be correctly positioned with respect to the guide means 8. In particular, there is no need for a preliminary step to adjust the position of the resilient deformation means 11. In addition, there is no risk of a subsequent change of position of the resilient deformation means 11.

Here, the resilient deformation means 11 comprise a single pressing member 12 which is intended to make a press against a portion of the magnetic card 2 facing the magnetic reading head 6 in order to press the three magnetic strips 9 of the magnetic card 2 against the three gaps 10 of the magnetic reading head 6 to guarantee a good quality contact between these elements. FIG. 2 shows the magnetic card 2 at a particular stage as it slides in the passage zone 7 where it has not yet reached the pressing member 12 and has not yet been deformed by the resilient deformation means 11. The pressing member 12 has a convex shape towards the magnetic reading head 6 and its surface curvature is the same as that of the magnetic reading head 6. As indicated previously, this configuration is advantageous to hold the magnetic card 2 more securely in the passage zone 7. In the rest position (see FIG. 2), the resilient deformation means 11 are configured so that the pressing member 12 rests on the magnetic reading head 6 without applying force on it. As shown on FIG. 2, at rest, there is therefore a contact between the pressing member 12 and the magnetic reading head 6, which relieves the pressing member 12. However, since no force is applied by the pressing member 12 on the magnetic reading head 6, there is no risk of the latter being damaged.

The pressing member 12 is connected to the rest of the resilient deformation means 11 by three elastic return members 13 intended to return the resilient deformation means 11 to a rest position when or after the magnetic card 2 slides in the passage zone 7. In this case, each elastic return member consists of a pair of elastic tabs 14 each arranged on each side of the pressing member 12. They exert a force on this pressing member 12 tending to move it to the rest position, in other words towards the magnetic reading head 6 when the pressing member 12 is moved in the opposite direction, which is the case in particular when the magnetic card 2 slides in the passage zone 7.

In the present case, the resilient deformation means 11 are made of plastic materials, for example polyoxymethylene (POM), which are materials offering properties of surface roughness and resistance over time that are satisfactory for the required use. Preferably, the guide means 8 are made of the same material as that used for the resilient deformation means 11. In this case, the guide means 8 are therefore made of plastic materials, for example polyoxymethylene (POM).

The resilient deformation means 11 are configured so as to allow the magnetic card 2 to slide in the passage zone 7 in a first sliding direction and in a second sliding direction opposite to the first sliding direction. According to this embodiment, the resilient deformation means 11 therefore have an axial axis of symmetry allowing the magnetic card 2 to slide in the passage zone 7 regardless of the sliding direction.

It is to be noted that it is easy to adapt the forces applied by the resilient deformation means 11 depending on the product required by modifying, for example, the geometry and/or the materials used to make the resilient deformation means 11. This adaptation can be carried out irrespective of a potential supplier of the magnetic reading head 6, which is particularly advantageous. Typically, the force applied by the pressing member 12 against the portion of the magnetic card 2 against which it presses is about 4 newtons. This force is high enough to allow satisfactory contact between the magnetic card 2 and the magnetic reading head 6 and low enough to avoid the risk of damaging the magnetic card 2 and/or the magnetic reading head 6. Obviously, this force can be adapted according to the characteristics of the magnetic card reader 1 and of the magnetic card 2.

We will now describe the operation of the electronic payment terminal 3 comprising the magnetic card 2 reader 1 according to the first embodiment of the invention.

When a user wants to make a payment with their magnetic card 2, which is therefore in this case a bank card, they insert it in the zone 7 for passage of the magnetic card 2 consisting of the slot formed in the lower edge of the electronic payment terminal 3 with the magnetic strips 9 of the magnetic card 2 directed upwards with reference to FIG. 1. The user slides the magnetic card 2 in the direction A in this slot and the magnetic card 2 is, initially, guided by guide means 8 consisting of the walls of the box of the electronic payment terminal 3. The magnetic card 2 is in particular pressed in the bottom of the slot by its upper edge. The user continues to slide the magnetic card 2 in the direction A and, when the magnetic card 2 reaches the pressing member 12 of the resilient deformation means 11, the magnetic card 2 moves this pressing member 12 against its rest position and the latter exerts in return, under the effect of the elastic return members 13, a force against the magnetic card 2 so as to deform it and press the portions of the magnetic strips 9 which pass opposite the gaps 10 of the magnetic reading head 6 against these gaps 10. This contact between the magnetic strips 9 and the gaps 10 ensures a good quality reading of the magnetic strips 9. The resilient deformation means 11 are configured so that the force applied on the magnetic card 2 is high enough to deform the magnetic card 2 sufficiently in order to establish a satisfactory contact with the magnetic reading head 6 and not too high to avoid creating for the user a feeling of blocking or discontinuity in the sliding movement of the magnetic card 2. Apart from being prejudicial to the user's experience, such a discontinuity in the sliding movement would also impair the reading quality of the magnetic card 2. As the magnetic card 2 slides, the pressing member 12 presses successively a portion of the magnetic strips 9 opposite the gaps 10 of the magnetic reading heads 6 such that when sliding stops, the three magnetic strips 9 have each been read over their entire length. Once the pressing member 12 is no longer moved by the magnetic card 2, the elastic return members 13 return it to the rest position such that the pressing member 12 is ready to press another magnetic card 2 against the magnetic reading head 6. The data which have been read by the magnetic reading head 6 are transmitted directly to the electronic card 5 which can process them in a known manner.

We will now describe with reference to FIG. 5 an electronic payment terminal 3 comprising a magnetic card 2 reader 1 according to a second embodiment of the invention. For clarity purposes, the same numerical references have been used for the same elements in the two embodiments. The second embodiment is only described below with respect to its differences compared with the first embodiment.

The only difference between the magnetic card 2 reader 1 of the second embodiment and the magnetic card 2 reader 1 of the first embodiment is its resilient deformation means 11.

According to the second embodiment, the resilient deformation means 11 comprise two pressing members 12 intended to make a press against two portions of the magnetic card 2 located each side of the magnetic reading head 6 in order to press the magnetic strips 9 of the magnetic card 2 against the gaps 10 of the magnetic reading head 6 (see FIG. 5). These two presses each side of the magnetic reading head 6 create three deformation regions of the magnetic card 2, in other words the two portions of the magnetic card 2 where the pressing members 12 make a press and the portion of the magnetic card 2, comprising the magnetic strips 9, which is pressed against the gaps 10 of the magnetic reading head 6. These three deformations therefore guarantee greater stability of the magnetic card 2 as it slides in the slot and also guarantee a good quality contact between the magnetic strips 9 of the magnetic card 2 and the magnetic reading head 6 over the entire length of the magnetic strips 9 as the magnetic card 2 slides in front of the magnetic reading head 6. The deformation caused by the resilient deformation means 11 results in the application of a force of about 4 newtons on the portion of the magnetic card 2 which is pressed against the magnetic reading head 6. This force is high enough to allow satisfactory contact between the magnetic card 2 and the magnetic reading head and low enough to avoid the risk of damaging the magnetic card 2 and/or the magnetic reading head 6. Obviously, this force can be adapted according to the characteristics of the magnetic card reader 1 and of the magnetic card 2.

According to this second embodiment, the resilient deformation means 11 comprise a beam 15 connecting these resilient deformation means 11 to the guide means 8. The beam 15 is integral with the guide means 8. This beam 15 deforms by torsion as the card passes.

As for the first embodiment, each pressing member 12 is connected to the rest of the resilient deformation means 11 by three elastic return members 13 intended to return the resilient deformation means 11 to a rest position when or after the magnetic card 2 slides in the passage zone 7. Obviously, the number of elastic return members 13 can vary depending on the embodiments.

We will now describe the operation of the electronic payment terminal 3 comprising the magnetic card 2 reader 1 according to the second embodiment of the invention.

When a user wants to make a payment with their magnetic card 2, which is therefore in this case a bank card, they insert it in the zone 7 for passage of the magnetic card 2 consisting of the slot formed in the lower edge of the electronic payment terminal 3 with the magnetic strips 9 of the magnetic card 2 directed upwards with reference to FIG. 1. The user slides the magnetic card 2 in the direction A in this slot and the magnetic card 2 is, initially, guided by guide means 8 consisting of the walls of the box of the electronic payment terminal 3. The magnetic card 2 is in particular pressed in the bottom of the slot by its upper edge. The user continues to slide the magnetic card 2 in the direction A and, when the magnetic card 2 reaches the first of the two pressing members 12 of the resilient deformation means 11, the magnetic card 2 moves this pressing member 12 against its rest position and the latter exerts in return, under the effect of the elastic return members 13, a force against the magnetic card 2 so as to deform it and make a press against a portion of the magnetic card 2 located offset relative to the reading head (FIG. 3). The user continues to slide the magnetic card 2 in the slot. The deformation caused by the first pressing member 12 is then already sufficient to press the magnetic strips 9 against the gaps 10 of the magnetic reading head 6 when the magnetic strips 9 arrive opposite these gaps 10. The user still continues to slide the magnetic card 2 in the slot such that the magnetic card 2 moves the second pressing member 12 against its rest position and the latter exerts in return, under the effect of the elastic return members 13, a force against the magnetic card 2 so as to deform it and make a press against a second portion of the magnetic card 2 located offset relative to the magnetic reading head 6. Thus, in this configuration, the two pressing members 12 make presses on portions of the magnetic card 2 located each side of the magnetic reading head 6. In this configuration, the application of pressure on the magnetic card 2 in order to keep the magnetic strips 9 and the gaps 10 of the magnetic reading head 6 in contact is of better quality. The user then finishes sliding the magnetic card 2 in the slot such that the magnetic strips 9 will each have been read over their entire length by the magnetic reading head 6. The data read by the magnetic reading head 6 are then transmitted to the electronic card 5 to which it is welded, which processes them in a known manner. In this embodiment, since the force applied by the pressing members 12 is distributed on two pressing members 12, the magnetic card 2 slides in the slot more easily and more fluidly.

The invention is not limited to the embodiments described and other embodiments will be clearly apparent to those skilled in the art.

LIST OF REFERENCES

1: magnetic card reader
2: magnetic card
3: electronic payment terminal
4: smart card reader
5: electronic card
6: magnetic reading head
7: zone for passage of the magnetic card
8: means for guiding the magnetic card
9: magnetic strip
10: gap
11: resilient deformation means of the magnetic card
12: pressing member
13: elastic return member
14: tab of the elastic return member
15: beam

The invention claimed is:

1. A magnetic card reader, comprising:
an electronic card configured to receive and process data coming from a magnetic card,
a magnetic reading head configured to read data contained in at least one magnetic strip of the magnetic card and to transmit these data to the electronic card, and a zone for passage of the magnetic card, in which the magnetic card is intended to slide, and which comprises a guide member to guide the magnetic card as the magnetic card slides in the passage zone, wherein the magnetic reading head is fixedly mounted on the magnetic card reader,
wherein the guide member is integrally formed as a single part with resilient deformation members which are configured to come into contact with the magnetic card so as to deform it when the magnetic card slides in the passage zone in order to allow the magnetic strip of the magnetic card to be read by the magnetic reading head.

2. The magnetic card reader according to claim 1, wherein the magnetic reading head is welded to the electronic card.

3. The magnetic card reader according to claim 1, wherein the resilient deformation members comprise at least one pressing member configured to make at least one press against at least one portion of the magnetic card in order to deform it such that the magnetic strip of the magnetic card is in contact with the magnetic reading head over its entire length when the magnetic card slides in the passage zone.

4. The magnetic card reader according to claim 3, wherein the pressing member is configured to make a press against a portion of the magnetic card facing the magnetic reading head in order to press the magnetic strip of the magnetic card against the magnetic reading head.

5. The magnetic card reader according to claim 4, wherein the pressing member has a convex shape towards the magnetic reading head and a surface curvature of the pressing member is the same as that of the magnetic reading head.

6. The magnetic card reader according to claim 5, wherein the resilient deformation members are configured so that, in a rest position, the pressing member rests on the magnetic reading head without applying any force on the magnetic reading head.

7. The magnetic card reader according to claim 3, wherein the resilient deformation members comprise two pressing members configured to make a press against two portions of the magnetic card located each side of the magnetic reading head in order to press the magnetic strip of the magnetic card against the magnetic reading head.

8. The magnetic card reader according to claim 1, wherein the resilient deformation members comprise at least three elastic return members configured to return the resilient deformation members to a rest position when or after the magnetic card slides in the passage zone.

9. An electronic payment terminal comprising the magnetic card reader according to claim 1.

10. The electronic payment terminal according to claim 9, wherein the zone for passage of the magnetic card consists of a slot formed in a lower edge of the electronic payment terminal.

11. The magnetic card reader according to claim 2, wherein the resilient deformation members comprise at least one pressing member configured to make at least one press against at least one portion of the magnetic card in order to deform it such that the magnetic strip of the magnetic card is in contact with the magnetic reading head over its entire length when the magnetic card slides in the passage zone.

12. The magnetic card reader according to claim 4, wherein the resilient deformation members are configured so that, in a rest position, the pressing member rests on the magnetic reading head without applying any force on the magnetic reading head.

* * * * *